April 17, 1956     E. C. ELSNER     2,742,307

CONNECTION AND FASTENING DEVICE

Filed April 21, 1951

EDWIN C. ELSNER,
INVENTOR.

BY

ATTORNEY

United States Patent Office 2,742,307
Patented Apr. 17, 1956

2,742,307

CONNECTION AND FASTENING DEVICE

Edwin C. Elsner, Glendale, Calif., assignor to General Logistics, Pasadena, Calif., a corporation of California Application April 21, 1951, Serial No. 222,247

2 Claims. (Cl. 287—20)

The present invention relates generally to connecting and fastening devices, and is more particularly concerned with an attachment fitting of the type which may be quickly connected and disconnected, without the use of tools.

Such fittings are susceptible of general application and are especially advantageous of use for releasably securing parts together. For example, they are especially useful for securing chairs, tables, etc., to floors and decks, and for retaining stanchions, partitions and wall members generally in a desired position.

One object of the invention is to provide releasable connecting and fastening means of simple, compact and rigorous construction having a small number of parts, which are so arranged and associated that they will withstand very high working stresses.

A further object is to provide in fittings of the herein described type, interlocking means which are devoid of biasing springs; which may be quickly actuated to connect complementary parts against separation; and in which the interlocking means are positively retained against disengagement until purposely released.

Further objects of the invention will be brought out in the following part of the specification, wherein detailed description is for the purpose of fully disclosing the invention without placing limitations thereon.

Referring to the accompanying drawings, which are for illustrative purposes only:

Referring generally to the drawings, for illustrative purposes the present invention will be observed to consist of complementary structures A and B which are according to the broad concepts of the invention arranged to be connected and disconnected for the securing of parts together, and for general application. More specifically the complementary structures may be utilized for securing chairs, stanchions and the like to floors and decks, as well as for the securing of bulk heads, partitions, etc., in place.

Figure 2:
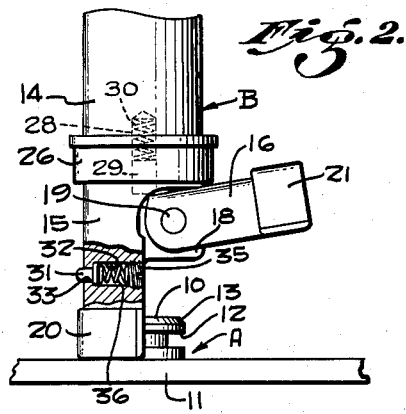
Fig. 2 is a similar view showing complementary members thereof in position for disengagement, and having a cutaway portion showing details of a spring detent associated with one of the complementary members.
Figure 3:
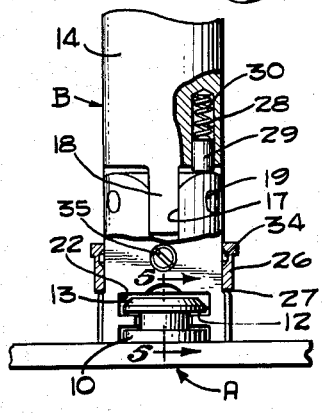
Fig. 3 is a sectional view, taken substantially on line 3—3 of Fig. 1; and including cutaway portion showing details of spring biasing means as utilized therein.
Figure 4:
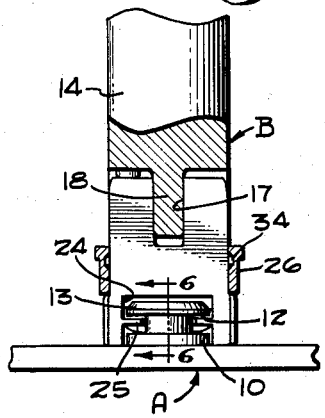
Fig. 4 is a sectional view, taken substantially on line 4—4 of Fig. 1.

The structure A comprises a stud 10 which is mounted in conventional manner upon a member 11 which may comprise a supporting plate, floor member, deck member or any other suitable support to which the stud may be welded, screwed or otherwise secured. The stud 10, as shown in Figs. 2, 3 and 4, has a circumferentially extending groove which results in the formation of an enlarged head end portion 13 at the projecting end of the stud.

While in the present instance, the stud is shown as projecting above the surface of the member 11, it will be appreciated that the stud may be mounted in a floor recess or deck depression so that the upper end of the stud will be below the general floor or deck surface.

The complementary structure B is disclosed as comprising an elongate metallic member 14, in this instance of cylindrical solid construction, having a split end portion formed by a fixed arm 15 and a swingable arm 16, this latter arm being provided with an end slot 17 which is adapted to receive a hinge lug 18 therein. A pivot pin 19 extends through the slotted end of the arm 16 and the associated lug 18 so as to permit swinging movements of the arm 16 with respect to the fixed arm 15. The arms 15 and 16 as thus associated may be positioned as shown in Fig. 1, in which case the arms are in substantially parallel relation, or the arms may be relatively positioned as shown in Fig. 2, in which position the arms are diverging, the arm 16 extending at substantially right angles to the arm 15.

Figure 1:
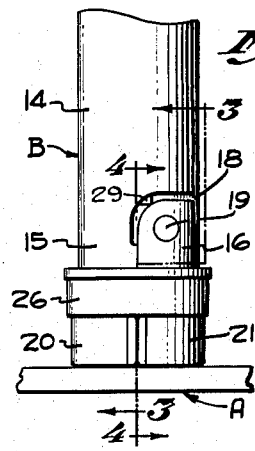
Fig. 1 is an elevational view of an attachment fitting embodying the features of the present invention, complementary members thereof being shown in connected engagement.

It will be observed that the outer surfaces of the arms 15 and 16, when in the position shown in Fig. 1, form a continuation of the main surface of the metallic member 14, until an enlarged end portion 20 on the arm 15 and enlarged end portion 21 on the arm 16 is reached.

Figure 5:
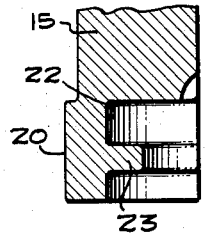
Fig. 5 is an enlarged fragmentary sectional view, taken substantially on line 5—5 of Fig. 3, showing details of the jaw construction.
Figure 6:
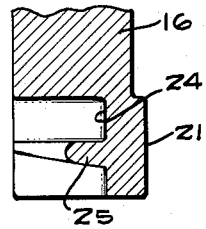
Fig. 6 is a similar view, taken substantially on line 6—6 of Fig. 4.

The end portions 20 and 21 constitute jaws which may be interfittingly connected with, and disconnected with respect to the stud 10. As shown in Figs. 3 and 5, the end portion 20 is provided with a semicircular end recess 22 having an internal arcuate flange 23 positioned between the outer end of the recess and the bottom thereof.

In a similar manner, the end portion 21 is likewise provided with a recess 24 and an internal arcuate flange 25, except that this flange is wedge shape, the lower surface of the flange being inclined so as to provide a narrowed inner flange edge.

The recesses 22 and 24, when the arms 15 and 16 are in the position shown in Fig. 1, will be in confronting relation and the flanges 23 and 25 will enter the groove 12 of the stud 10, swinging movement of the flange 25 to this position being permitted due to its wedge shape.

With the flanges 23 and 25 thus engaged in the groove 12, the complementary structures A and B are secured against separation, so long as the arms 15 and 16 are retained in the position shown in Fig. 1. However, if the arm 16 is moved by swinging movement to a disengaged or diverging position with respect to the arm 15, for example as shown in Fig. 2, then the flange 23 may be laterally moved out of the groove 12 and the complementary structures separated.

As shown in Figs. 1 and 2, means are provided for releasably retaining the arms 15 and 16 in the position shown in Fig. 1, wherein the end portions 20 and 21 engage the stud 10. For such purpose, a longitudinally slidable ring 26 is provided. This ring may be moved to the position shown in Fig. 1, wherein it will abut a shoulder 27 cooperatively formed by the upper edges of the expanded end portions 20 and 21. Since the ring 26 is in this position below the pivot pin 19, the arm 16 will be positively held against swinging movement which would tend to disengage the flange 25 from the groove 12 of stud 10. However, if the ring 26 should now be moved to a position, as shown in Fig. 2, where it is above the pivot pin 19, the arm 16 may then be swingably moved away from the arm 15 so as to release the flanges 23 and 25 from the groove 12 of the stud.

It is advantageous, to retain the arm 16 in the position shown in Fig. 2, particularly when there may be several attaching fittings which are utilized, for example, to secure a chair to the floor or deck. For such purpose, an elongate recess 28 is provided above the pivot pin 19, in which there is slidably positioned a pin 29 which is urged against the associated end portion of the arm 16 by means of an expansion spring 30. With the spring urged pin 29 positioned as it is above the pivot pin 19, there is little force normally acting to swing the arm 16 away from the arm 15. However, as the arm 16 reaches the raised position, as shown in Fig. 2, the pin 29 acts to hold the arm 16 in that position.

Provision is made for releasably retaining the ring 26 in the position shown in Fig. 1 by providing a detent pin 31 which is seated in a recess 32 of the arm 15 with an end projecting through an opening 33 so as to extend into an internal circumferentially extending groove 34 on the interior of the ring 26. The recess 32 is closed by a screw plug 35. An expansion spring 36 is positioned within the recess, this spring having its ends respectively bearing against the screw plug and the detent pin 31 to urge the pin into the groove 34, and thus releasably retain the ring in a position locking the arms 15 and 16 together, and preventing swinging movement apart as described.

The utilization of a ring member in the manner described above, provides a positive holding means so that relatively large forces may be exerted on the complementary structures A and B, before it is possible to separate them. At the same time, it is possible to quickly and easily release the arms 15 and 16 by raising the ring 26, thus permitting the arm 16 to be swung to the position shown in Fig. 2 and enabling the complementary structures A and B to be readily separated.

It will be understood that minor changes in the size, form and construction of the various parts of the attachment fitting may be made and substituted for those herein shown and described, without departing from the spirit of the invention, the scope of which is set forth in the appended claims.

I claim:

1. A connecting and fastening device, comprising: an anchor stud adapted to be secured in a fixed position projecting upwardly from a plane surface, such stud having a circumferential groove spaced from said surface; a movable elongate member having a split end, one portion of which is fixed and another portion of which is hinged for swinging movement between a position parallel to the fixed portion and a position angularly outward from said parallel position, said swinging portion being provided with a surface portion adjacent the hinge thereof that moves through the same angle of swing as does the mentioned hinged portion; jaws carried by said portions and engaging said stud so as to secure said member to said anchor stud, said jaws being in closed position when the end portions are substantially in said parallel relation, and in opened position when the end portions are angularly positioned; substantially semicircular complementary flanges respectively on the confronting faces of said jaws, located in closed position of the jaws in said groove of the stud; and detent means in said elongate member in position to engage said surface portion of the hinged portion and to hold the latter in said opened angular position.

2. A connecting and fastening device comprising: an elongate member having a lower end that is eccentrically offset with respect to the general length of said member, the offset defining a side space alongside the offset end; an end complementary to the offset end; a transverse hinge connecting the complementary end to the elongate member in position to move between a closed position in said side space alongside the offset and an open and upwardly angular position with respect to the elongate member; the complementary ends, when closed, abutting and cooperating to engage with an anchor stud and to thereby hold the elongate member against endwise movement away from said stud; an end surface portion of the hinged end moving with said hinged end between a position inward of the hinge and at the line of abutment of the complementary ends, when the hinged end is opened and an outward position relative to said hinge when the hinged end is closed; and a detent carried by the elongate member in position to resiliently engage said end surface portion, when the hinged end is opened, to retain said opened position.

References Cited in the file of this patent

UNITED STATES PATENTS

| | | |
|---|---|---|
| 519,454 | Holland | May 8, 1894 |
| 718,306 | Boring | Jan. 13, 1903 |
| 1,099,811 | Morse et al. | June 9, 1914 |
| 1,314,044 | Buker | Aug. 26, 1919 |
| 1,815,660 | Walker | July 21, 1931 |
| 1,851,843 | Inman | Mar. 29, 1932 |
| 1,896,645 | Pfauser | Feb. 7, 1933 |
| 2,408,547 | Bertschinger | Oct. 1, 1946 |
| 2,448,817 | McArthur | Sept. 7, 1948 |
| 2,589,922 | Bowman | Mar. 18, 1952 |